United States Patent [19]

Hollweck

[11] 4,112,765
[45] Sep. 12, 1978

[54] EXPANSION DIAPHRAGM-TYPE TEMPERATURE SENSOR

[75] Inventor: Walter Hollweck, Nuremberg, Fed. Rep. of Germany

[73] Assignee: Inter Control Hermann Köhler Elektrik GmbH & Co. KG, Nuremberg, Fed. Rep. of Germany

[21] Appl. No.: 772,600

[22] Filed: Feb. 28, 1977

[30] Foreign Application Priority Data

Mar. 3, 1976 [DE] Fed. Rep. of Germany ....... 2608675

[51] Int. Cl.² ........................ G01K 5/32; H01H 37/40
[52] U.S. Cl. ..................................... 73/368.3; 337/321
[58] Field of Search .................... 73/368.3, 368.4, 368; 236/99 R; 337/119, 321; 200/83 R

[56] References Cited

U.S. PATENT DOCUMENTS

| 2,632,475 | 3/1953 | Elo ................................... 73/368.4 X |
| 2,989,083 | 6/1961 | Siri ................................... 73/368.3 X |
| 3,082,626 | 3/1963 | Perkins ............................... 73/368.4 |
| 3,113,438 | 12/1963 | Hubacker et al. ............... 337/321 X |
| 3,163,045 | 12/1964 | Kaveckas et al. ............... 73/368.3 X |
| 3,412,357 | 11/1968 | Odashima ......................... 337/321 X |

FOREIGN PATENT DOCUMENTS 586,755  11/1959  Canada ..................................... 337/321

Primary Examiner—Daniel M. Yasich
Attorney, Agent, or Firm—Spencer & Kaye

[57] ABSTRACT

A temperature sensor includes a liquid-filled sensor tube, an expansion diaphragm assembly and a capillary tube maintaining communication between the sensor tube and the diaphragm assembly for introducing into the diaphragm assembly temperature-dependent amounts of liquid for causing displacement of a diaphragm component to thereby actuate a switch. The expansion diaphragm assembly comprises a stable carrier plate to which there is affixed a circular, resilient, expandable diaphragm disc having a flat circumferential edge zone.

4 Claims, 2 Drawing Figures

EXPANSION DIAPHRAGM-TYPE TEMPERATURE SENSOR

BACKGROUND OF THE INVENTION

This invention relates to a temperature sensor having an expansion diaphragm assembly for operating a snap action switch and further including a liquid-filled sensor tube and a capillary tube which serves for maintaining communication between the sensor tube and the expansion diaphragm assembly.

Sensor devices of the above-outlined type are known wherein the expansion diaphragm assembly is formed of two resilient box halves which are joined to one another along their edge zone by means of welding or soldering. One box half is, through an opening, coupled with a capillary tube through which passes, subsequent to heating, the heat-expandable liquid contained in the sensor tube. The increase of the volume within the expansion diaphragm obtained in this manner causes the other closed box half to be displaced through a path which is utilized to actuate a snap action switch.

In the known structures the box half provided with the opening is attached to a carrier plate either directly or by means of a usually cylindrical intermediate component. The intermediate component may, in a conventional manner, be held in a desired value setting device.

The above-outlined known structures all have the disadvantage that for the manufacture of the expansion diaphragm assembly two box halves are necessary which have to be welded or otherwise joined to one another and to a carrier plate or, as the case may be, to a usually expensive intermediate component.

It is a further disadvantage of the known arrangements that in most cases a large structural height is required so that the total structural height of the temperature sensor (thermostat) renders it inconvenient or unadapted for use in certain environments, for example, in household appliances.

SUMMARY OF THE INVENTION

It is an object of the invention to provide an improved temperature sensor which includes an expansion diaphragm assembly and from which the above-discussed disadvantages are eliminated.

This object and others to become apparent as the specification progresses, are accomplished by the invention, according to which, briefly stated, the temperature sensor has an expansion diaphragm assembly in which a resilient diaphragm disc is directly and stationarily attached to a stable carrier plate. The diaphragm disc is of circular shape which is flat along its edge zone. Between the edge zone and the disc center the diaphragm disc has concentric corrugations. In the edge zone the diaphragm disc is affixed in a fluid tight manner with the carrier plate, for example, by a weld along the perimeter of the diaphragm disc.

Further according to the invention, in the carrier plate, at the side oriented towards the diaphragm disc, there is provided a depression which is shaped to conform to the end of the capillary tube and which extends approximately parallel to the diaphragm disc. In the carrier plate, at one end of the depression there is provided an opening through which the terminus of the capillary tube passes and nests in the conformingly-shaped depression. The capillary tube is supported in the carrier plate, for example, by soft soldering; the opening at the depression is sealed around the capillary tube. This arrangement is of particular advantage because the capillary tube extends approximately parallel to the diaphragm disc and thus the structural height of the device is reduced.

The expansion diaphragm assembly further has, according to the invention, between the carrier plate and the diaphragm disc, a preferably thin metal disc which is stationarily fixedly connected with the carrier plate and with the capillary tube end situated between the carrier plate and the diaphragm disc. This connection is made simultaneously with the soldering of the capillary tube by allowing the solder to flow through one or more openings in the carrier plate onto the metal disc, whereby a bond is effected. The metal disc is connected with the solder only inwardly of its edge, so that the metal disc lies, with its circumference, loosely on the carrier plate. Thus, the liquid can flow in an unobstructed manner from the capillary tube into the space defined between the metal disc and the diaphragm disc. Arranging the expansion diaphragm in this manner is particularly advantageous because the diaphragm disc is protected against mechanical defects or damage by the terminus of the capillary tube.

Preferably, for the soldering involving the carrier plate a soft solder is used to ensure that the diaphragm disc disposed in the vicinity of the carrier plate is not damaged during the soldering operation by excessive heat.

In accordance with a further feature of the invention, on the carrier plate there are provided means for securing the capillary tube to provide a protection of the soldered location if the capillary tube is exposed to bending.

In accordance with a preferred embodiment of the invention, one or more bent, apertured tabs are provided at the edge of the carrier plate. The capillary tube passes through the tabs and is supported thereby.

DESCRIPTION OF THE PREFERRED EMBODIMENT

Figure 1:
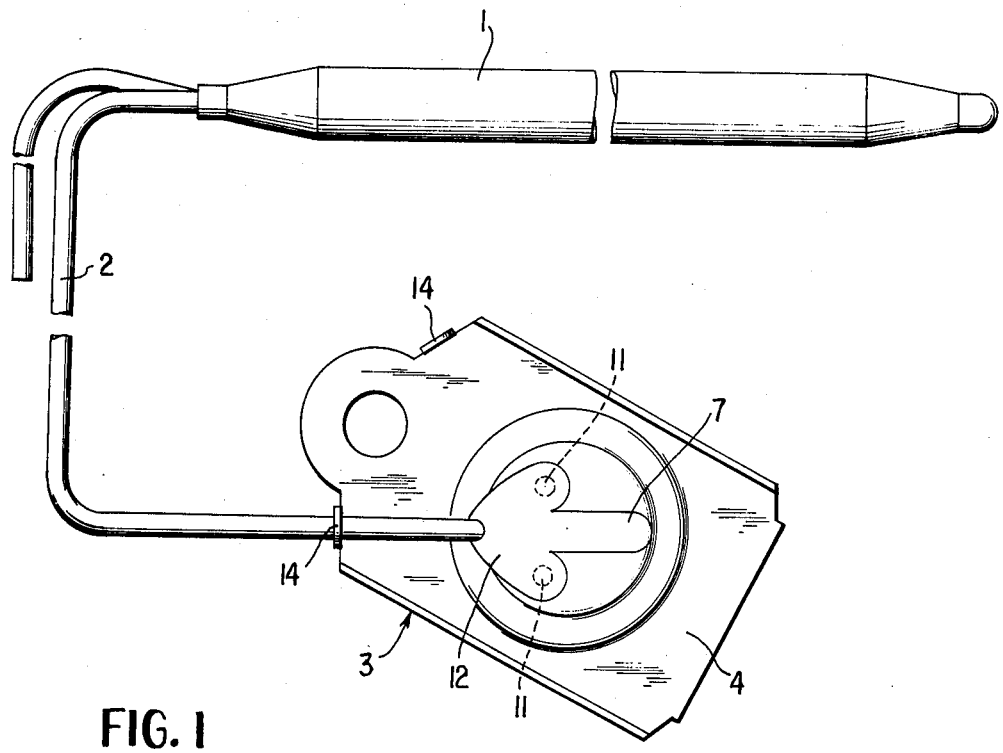
FIG. 1 is a schematic top plan view of a preferred embodiment of the invention including a sensor tube, a capillary tube and an expansion diaphragm assembly.
Figure 2:
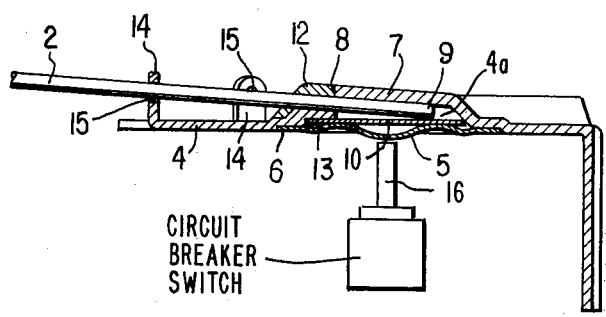
FIG. 2 is a sectional elevational view of a detail of FIG. 1.

Turning now to FIG. 1, there is shown a sensor tube 1 which is connected with an expansion diaphragm assembly 3 by means of a capillary tube 2. The diaphragm assembly 3 comprises, as may also be observed in FIG. 2, a fixed carrier plate 4 which has a slightly dished portion to form an open depression or cavity 4a. To the carrier plate 4 there is stationarily connected a resilient circular diaphragm disc 5 which extends over the cavity 4a, generally flush with an outer face of the carrier plate 4.

The diaphragm disc 5 has, along its radially extended edge zone 6, a flat configuration and is provided, between the edge zone 6 and the disc center, with concentrically arranged annular corrugations. In the area of the edge zone 6, the diaphragm disc 5 is welded fluid tight to the carrier plate 4. Thus, the cavity 4a is closed fluid tight by the diaphragm disc 5 so that these two components define a fluid tight expansion chamber. The carrier plate 4 is, on its side oriented towards the diaphragm disc 5, provided with an elongated depresssion 7 (formed, for example, by embossing) which conforms to the shape of the capillary tube terminus 9 and which extends approximately parallel to the diaphragm disc 5.

In the carrier plate 4, at one end of the elongated depression 7 there is provided an opening 8 through which the terminus 9 of the capillary tube 2 passes.

The expansion diaphragm assembly 3 has, between the carrier plate 4 and the diaphragm disc 5, a preferably thin metal disc 10 which is stationarily secured to the carrier plate 4 and to the capillary tube terminus 9 disposed in the inside of the diaphragm assembly 3.

In the carrier plate 4 there are provided one or more openings 11 through which the solder 12 flows and where a bond will be obtained between the carrier plate 4 and the metal disc 10. The latter thus lies, with its periphery 13 unbonded and in a loose manner against the carrier plate 4. Thus, liquid driven by the pressure caused by heat expansion can pass freely into or, as the case may be, out of the space defined between the thin metal disc 10 and the diaphragm disc 5 to cause movement of the latter. With the diaphragm disc 5 there is operatively coupled, in a conventional manner, an operating member 16 of a circuit breaker switch which is actuated by virtue of the displacement of the diaphragm disc 5. Such a cooperation between a diaphragm disc and a switch is disclosed, for example, in U.S. Pat. No. 3,163,045.

Further, at the carrier plate 4, one or more angularly bent tabs 14 are provided which have an opening 15 through which the capillary tube 2 passes and in which it is supported by the tabs 14.

It will be understood that the above description of the present invention is susceptible to various modifications, changes and adaptations, and the same are intended to be comprehended within the meaning and range of equivalents of the appended claims.

What is claimed is:

1. In a temperature sensor including a liquid-filled sensor tube, an expansion diaphragm assembly and a capillary tube maintaining communication between the sensor tube and the diaphragm assembly for introducing into the diaphragm assembly temperature-dependent amounts of liquid for causing displacement of a diaphragm component to thereby actuate a switch; the improvement wherein said expansion diaphragm assembly comprises
    (a) a substantially flat, stable carrier plate including a dished portion defining a cavity and having an opening;
    (b) a substantially flat, circular, resilient, expandable diaphragm disc having a radially extending flat circumferential edge zone; said diaphragm disc extending over said cavity to define therewith an expansion chamber;
    (c) a fluidtight weld in said edge zone for affixing said diaphragm disc along said edge zone to said carrier plate;
    (d) a metal disc positioned in said expansion chamber generally parallel to said diaphragm disc; said metal disc having a perimeter engaging unbonded said carrier plate; and
    (e) securing means for directly affixing said capillary tube to said dished portion; said capillary tube maintaining communication between said sensor tube and said expansion chamber; said securing means including
        (1) means defining an elongated depression provided in a face of said dished portion orientated towards said diaphragm disc; said depression extending approximately parallel to said diaphragm disc; said opening of said dished portion being disposed at one end of said depression; a terminal portion of said capillary tube passing through said opening and being conformingly received by said depression; and
        (2) means attaching said metal disc, inwardly of said perimeter, to said carrier plate and said terminal portion of said capillary tube.

2. A temperature sensor as defined in claim 1, wherein said diaphragm disc is flush with an outer face of said carrier plate.

3. A temperature sensor as defined in claim 1 wherein said means attaching said metal disc to said carrier plate is a soft solder.

4. A temperature sensor as defined in claim 3, said expansion diaphragm assembly further comprising at least one apertured tab attached to said carrier plate; said capillary tube passing through said tab and being supported thereby.

* * * * *